United States Patent
Yue et al.

(10) Patent No.: US 11,732,180 B1
(45) Date of Patent: Aug. 22, 2023

(54) TREATMENT COMPOSITION INCLUDING A POLYLACTIC ACID FOR A WELL AND METHOD RELATING THERETO

(71) Applicant: Halliburton Energy Services, Inc., Houston, TX (US)

(72) Inventors: Zhiwei Yue, Houston, TX (US); Linping Ke, Houston, TX (US); Julio Estuardo Vasquez Estrada, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/072,231

(22) Filed: Nov. 30, 2022

(51) Int. Cl.
  *E21B 37/06* (2006.01)
  *E21B 43/27* (2006.01)
  *C09K 8/528* (2006.01)
  *C08G 63/08* (2006.01)

(52) U.S. Cl.
  CPC .............. *C09K 8/528* (2013.01); *C08G 63/08* (2013.01); *E21B 37/06* (2013.01); *E21B 43/27* (2020.05)

(58) Field of Classification Search
  CPC ........... C09K 8/58; C08G 63/08; E21B 37/06; E21B 43/27
  See application file for complete search history.

(56) References Cited

U.S. PATENT DOCUMENTS

| | | | |
|---|---|---|---|
| 3,219,115 A | 11/1965 | Hower et al. | |
| 10,920,125 B2 | 2/2021 | Beuterbaugh et al. | |
| 11,401,453 B2 | 8/2022 | Larsen et al. | |
| 2004/0152601 A1 | 8/2004 | Still et al. | |
| 2005/0205265 A1* | 9/2005 | Todd | E21B 23/00 166/376 |
| 2006/0058197 A1* | 3/2006 | Brown | C09K 8/74 507/267 |
| 2008/0139417 A1* | 6/2008 | Alsyed | C09K 8/035 507/260 |
| 2009/0025933 A1* | 1/2009 | Garcia-Lopez de Victoria | C09K 8/74 507/221 |
| 2010/0252267 A1* | 10/2010 | Harris | C09K 8/52 166/307 |
| 2012/0285695 A1* | 11/2012 | Lafferty | C09K 8/03 166/310 |
| 2013/0312962 A1 | 11/2013 | Weaver et al. | |

(Continued)

FOREIGN PATENT DOCUMENTS

| CA | 2544834 C | 2/2010 |
|---|---|---|
| CA | 2787381 A1 | 8/2011 |

(Continued)

OTHER PUBLICATIONS

Filing Receipt, Specification and Drawings for U.S. Appl. No. 17/522,122, entitled "Strong Acid Precursor Generating and/or Releasing Strong Acid for Use Downhole in a Subterranean Formation Background," filed Nov. 9, 2021, 44 pages.

(Continued)

*Primary Examiner* — Silvana C Runyan
(74) *Attorney, Agent, or Firm* — Conley Rose, P.C.; Rodney B. Carroll

(57) ABSTRACT

A method for treating a well penetrating a subterranean formation, comprises placing a treatment composition comprising polylactic acid into the well, wherein the treatment composition is in the form of pellets, a cylindrical rod, or both.

20 Claims, 1 Drawing Sheet

(56) References Cited

U.S. PATENT DOCUMENTS

| | | |
|---|---|---|
| 2014/0202684 A1 | 7/2014 | Danait et al. |
| 2014/0202685 A1 | 7/2014 | Danait et al. |
| 2014/0318762 A1 | 10/2014 | Fontenelle et al. |
| 2014/0318777 A1 | 10/2014 | Fontenelle et al. |
| 2014/0329725 A1 | 11/2014 | Karale |
| 2014/0352959 A1* | 12/2014 | Nelson ................ C09K 8/5751 166/279 |
| 2016/0264849 A1 | 9/2016 | Oliveira et al. |
| 2019/0276732 A1 | 9/2019 | Beuterbaugh et al. |
| 2020/0377781 A1 | 12/2020 | Larsen et al. |

FOREIGN PATENT DOCUMENTS

| | | |
|---|---|---|
| CA | 2669192 C | 12/2013 |
| EP | 0775016 A1 | 5/1997 |

OTHER PUBLICATIONS

Filing Receipt, Specification and Drawings for U.S. Appl. No. 17/873,933, entitled "Method and System for Detecting One or More Properties, Positioning, and Minimizing Tension of a Waveguide," filed Jul. 26, 2022, 52 pages.

\* cited by examiner

TREATMENT COMPOSITION INCLUDING A POLYLACTIC ACID FOR A WELL AND METHOD RELATING THERETO

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present disclosure relates to a method for treating a well penetrating a subterranean formation can include placing a treatment composition including a polylactic acid into the well, and more specifically, the treatment composition can be in the form of pellets, a cylindrical rod, or both.

Some common subterranean treatment operations employing treatment fluids are acidizing operations. Illustrative acidizing operations may include, for example, matrix acidizing, acid fracturing, scale, such as carbonate, dissolution and removal, polymer breaking, filter cake dissolution, and the like. Often, these acidizing operations utilize a suitable acid, such as sulfamic acid. These acidizing operations may be used to accomplish a number of purposes. Such purposes may include increasing or restoring the permeability of subterranean formations so as to facilitate the flow of oil and gas from the formation into the well. Additionally, the acid treatments may also be used to remove deposits from the equipment and/or in the formation along as much of the hydrocarbon flow path as possible and/or to create new flow paths as in matrix acidization.

Although acidizing a portion of a subterranean formation and/or regions surrounding the wellbore may be beneficial, some acidizing systems have significant drawbacks. Typical materials used for acid treatment can have stability, storage, and handling issues. Particularly, such acid precursors may require specialized vehicles, pre-installed downhole tubing, and extensive review to protect personnel and/or equipment prior to inserting the treatment into the wellbore. As an example, sulfamic acid, upon information and belief, is on Department of Transportation hazardous chemical list and can result in a solid residue. Thus, providing a material for acid treatment being simple to handle and easy to use would overcome shortcomings posed by typical acid treatment materials.

BRIEF DESCRIPTION OF THE DRAWINGS

These drawings illustrate certain aspects of some of the embodiments of the present disclosure and should not be used to limit or define the claims.

Figure 1:
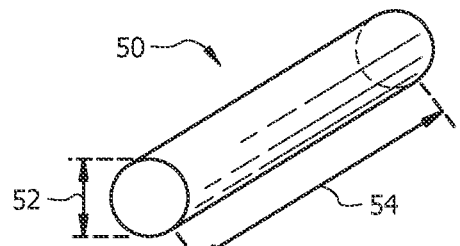
FIG. 1 is a perspective view of an exemplary cylindrical rod of a treatment composition with some embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to methods and compositions for use in a wellbore and/or subterranean formation. More particularly, the present disclosure relates to methods and compositions involving a precursor that generates and/or releases an acid, particularly lactic acid, for use in the wellbore and/or subterranean formation.

As used herein, the term "generate" and grammatical variants thereof shall be understood to also include the terms "release," "form," "create," and the like and grammatical variants thereof.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular source or action by the treatment fluid or a component thereof, unless otherwise specified herein.

As used herein, the term "and/or" can mean one, some, or all elements depicted in a list. As an example, "A and/or B" can mean A, B, or a combination of A and B.

As used herein, the term "deposits" includes, but is not limited to one or more of, filter cakes, biopolymers, synthetic polymers, hydrates, surfactants (including viscoelastic surfactants), bridging agents, scale deposits, skin deposits, and geological deposits.

As used herein, a "hydrocarbon chain" may be, unless otherwise specifically noted, branched, unbranched, non-cyclic, and/or cyclic; it may be substituted or unsubstituted (for example, it may or may not contain one or more additional moieties or functional groups in place of one or more hydrogen atoms in the hydrocarbon chain); it may be saturated or unsaturated; and/or it may be bonded to at least one other hydrocarbon chain.

As used herein, the nomenclature "$C_x$ to $C_y$," refers to the number of carbon atoms in the hydrocarbon chain (here, ranging from x to y carbon atoms).

As used herein, "independently" refers to the notion that the preceding items may be the same or different.

As used herein, the term "substituted" refers to one or more of the hydrogen atoms in the hydrocarbon chain being replaced by one or more functional groups. In such embodiments, the hydrocarbon chain may be substituted with one or more functional groups independently selected from an ether, an ester, a hydroxyl, an alkane, an alkene, an alkyne, and combinations thereof.

In some embodiments, a treatment composition can include polylactic acid (PLA) in the form of one or more solid acid sticks and pellets whereas PLA may be classified as a one hundred percent biosourced and biodegradable bioplastic, and thus be environmentally friendly. Once dropped from the wellhead, the PLA-based acid sticks can go through thermal hydrolysis reactions to release lactic acid providing in situ cleaning and/or dissolution of the downhole scale deposition from surfaces of tubing, equipment, or even the formation. The treatment composition can be in the form of pellets, a cylindrical rod, or both. The treatment composition may be used to dissolve solid scale to mitigate moderate carbonate scale build-up in open-hole low water-rate producing wells.

Figure 2:
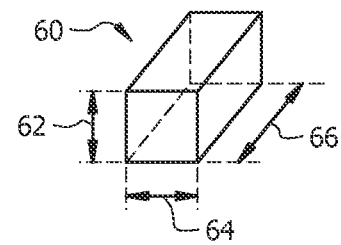
FIG. 2 is a perspective view of an exemplary pellet of a treatment composition with some embodiments of the present disclosure.

Referring to FIG. 1, a treatment composition can be in the form of a cylindrical rod 50 and have at least one dimension, such a diameter 52 and a length 54. The solid cylindrical rod may have a diameter of about 0.013 meter (m) to about 0.051 m and a length of about 0.15 m to about 0.61 m, and optimally a diameter of about 0.032 m and a length of about 0.38 m. Referring to FIG. 2, each of the pellets 60 can have a dimension, such as a thickness 62 of about 0.0064 m to about 0.019 m, a width 64 of about 0.0064 m to about 0.019 m, and a length 66 of about 0.0064 m to about 0.051 m. Optimally, each of pellets can have a width of about 0.013 m, a thickness of about 0.013 m, and a length of about 0.019 m. In some embodiments, the pellets, the cylindrical rod, or both are solid, and the pellets, the cylindrical rod, or both do not contact water prior to being placed into the well. Generally, the solid cylindrical rod is water soluble and decomposes in situ under ambient conditions present adjacent the treatable surface.

The treatment composition can include PLA, which may be an aliphatic polyester. In some embodiments, the PLA can include a group, in other words a repeating group or unit, of the formula:

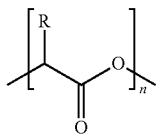

wherein:

n may be an integer of 77 to 10,000; and

R can be hydrogen, an alkyl, an aryl, an alkylaryl, an acetyl, or a heteroatom optionally substituted with an alkyl, an aryl, an alkylaryl, or an acetyl. The repeating unit can be terminated at either end by a suitable group or incorporated into a compound.

In some embodiments, the PLA may include a compound of the formula:

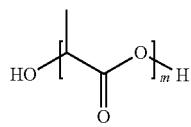

wherein m may be an integer of 2 to 75. Optionally, m can be an integer of 2 to 10. The PLA can have a molecular weight up to about 1,500,000 g/mol.

In some embodiments, the molecular weight of the PLA can be no more than about 5,400 g/mol, or optionally no more than about 720 g/mol. The PLA can include a specific gravity of about 0.9 to about 1.5, about 1.1 to about 1.3, or optimally about 1.25. The PLA can have a melt temperature of about 60° C. to about 200° C. about 70° C. to about 160° C., or even about 90° C. to about 150° C. The substantially cylindrical material can be substantially water soluble.

The PLA may be made of renewable resources, such as corn or sugar cane, using green chemistry. Due to recent developments, PLA can be composted at ambient conditions under influence of microorganisms, and thus, the PLA may be treated as municipal biowaste. The PLA can be used as degradable diverters and manufactured in small beads, but can be readily produced into stick or pellet forms.

Generally, PLA can be widely used as food packing materials, so PLA-acid sticks may be safe and convenient treatment, and therefore may be stable and safe for storage and handling. Thus, the treatment composition does not necessitate special acid trucks, pre-installed downhole tubing, or extensive health, safety and environmental review. Instead in some embodiments, just simple hand-dropping the PLA into the wellhead suffices. As the acid ingredient will be released slowly and immediately react with carbonate scales, minimum corrosion and health, safety and environmental concerns for its use in the well treatment are raised.

In some embodiments, a method of treating a well is included herein. The method for treating a well penetrating a subterranean formation can include placing a treatment composition including a polylactic acid into the well. In some embodiments, the treatment composition is in the form of pellets, a cylindrical rod, or both. The polylactic acid can be a precursor that forms lactic acid once placed in the wellbore and/or subterranean formation in the presence of water to, after dissolution, remove scale. The method can further include positioning the treatment composition adjacent a treatable surface in the well and allowing the treatment composition to form lactic acid that contacts the treatable surface.

In some embodiments, the treatable surface comprises scale and the lactic acid contacts the scale and removes at least a portion of the scale from the surface to provide a treated surface. The treatable surface may be provided by a tubular positioned in the well. The tubular can be a casing, a hydrocarbon production tubing, or both. In some embodiments, the treatable surface is disposed within an annular space formed between the hydrocarbon production tubular disposed within the casing, provided by and disposed within the subterranean formation, or provided by hydrocarbon production equipment located in the well or the subterranean formation.

The treatment composition can be a cylindrical rod and the cylindrical rod may be placed into the well via a surface wellhead. The cylindrical rod can be positioned adjacent a treatable surface by allowing the cylindrical rod to travel down the well via gravity, via pumping fluid into the wellhead and down the well, or both. The well can include a tubular positioned in the well and coupled to the surface wellhead, wherein the cylindrical rod travels from the wellhead a distance down the well though an inner bore of the tubular adjacent to the treatable surface, and wherein the inner bore is unobstructed along the distance traveled by the cylindrical rod.

Generally in some embodiments, the treatment composition is a plurality pellets and the plurality of pellets are placed into the well via a surface wellhead. Additionally, the plurality of pellets can be positioned adjacent a treatable surface by allowing the pellets to travel down the well via gravity, via pumping fluid into the wellhead and down the well, or both. Furthermore, the well can include a tubular positioned in the well and coupled to the surface wellhead. The tubular can form an annular space between an outer surface of the tubular and an inner surface of the well. Generally, the plurality of pellets travels from the wellhead a distance down the well though the annular space adjacent to the treatable surface, and the annular space is unobstructed along the distance traveled by the plurality of pellets.

Figure 3:
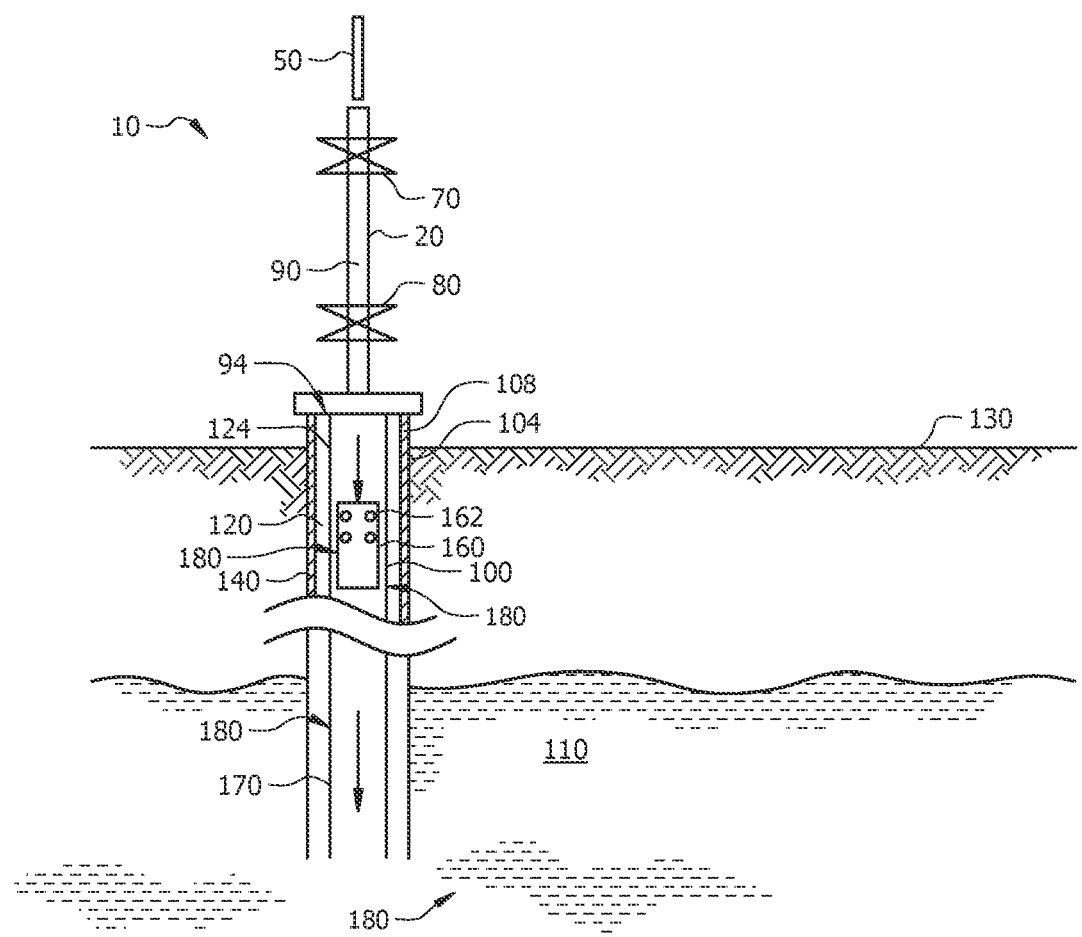
FIG. 3 a diagram illustrating an example of a subterranean formation in which a treatment fluid is introduced in accordance with some embodiments of the present disclosure.

Referring to FIG. 3, in some embodiments, a method for an oil producing well 10 including a wellhead piping 20 communicating with a wellbore 104 is depicted. The oil producing well 10 can produce oil as its primary commercial product. Typically, oil wells almost always produce some gas and frequently water too. The method can include introducing a substantially cylindrical material 50 including a polylactic acid into the wellhead piping. The wellhead piping 20 can further include first and second valves 70 and 80 coupled to the wellhead piping 20 forming an isolation chamber 90. Opening the first valve 70 can transport the substantially cylindrical material 50 into the isolation chamber 90 and closing the first valve 70 may isolate the substantially cylindrical material 50. Opening the second valve 80 can transport the substantially cylindrical material 50 into a wellbore 104 a distance to a location at least partially adjacent to an area of treatment 180.

The wellbore 104 extends from the surface 130 and through a portion of the subterranean formation 110. Although shown as vertical, the wellbore 104 may include horizontal, vertical, slanted, curved, and other types of wellbore geometries and orientations, and the treatment composition may be applied to a subterranean zone surrounding any portion of the wellbore 104. In some embodiments, the subterranean formation 110 may include acid-soluble components. For example, the subterranean formation may be a carbonate formation, sandstone formation, mixed carbonate-sandstone formation, or any other subterranean formation as may be advantageous to undergo an acidizing treatment. A casing 140 is formed in the wellbore 104 that is cemented with cement 108 or otherwise secured to the wellbore wall or can be uncased or include uncased sections. Perforations can be formed in the casing 140 to allow fluids and/or other materials to flow into the subterranean formation 110. In cased wells, perforations can be formed using shape charges, a perforating gun, hydro-jetting and/or other tools.

The casing 140 may surround a hydrocarbon production tubing 100 forming the annulus 120 therebetween. The hydrocarbon production tubing 100 can extend into the subterranean formation 110 as a work string 170. The work string 170 may include coiled tubing, jointed pipe, and/or other structures that allow fluid to flow into the wellbore 104. The work string 170 can also include flow control devices, bypass valves, ports, and or other tools or well devices that control a flow of fluid from the interior of the work string 170 into the subterranean formation 110 or a zone thereof. The work string 170 and/or the wellbore 104 may include one or more sets of packers effective to seal the annulus 120 between the work string 170 and wellbore 104 and/or a downhole portion of the wellbore 104 to define an interval of the wellbore 104 into which particulate materials and/or treatment fluids can be pumped.

The area of treatment 180 can include surfaces in the subterranean formation 110, a surface 124 of the annulus 120, equipment surfaces in the hydrocarbon production tubing 100, and surfaces of the work string 170. Thus, the area of treatment 180 can extend from the surface 130 of the wellbore 104 and into the subterranean formation 110. In some embodiments, one or more wellbore conditions may be monitored during injection, for example, temperature, pressure, fluid distribution, flow rate, pH, any physical or chemical property of the formation or formation fluids, and combinations thereof. For example, in some embodiments, one or more parameters, such as the injection rate, during injection based upon conditions such as fluid distribution and wellbore pressure.

In some embodiments, the wellbore 104 can include a tubing, such as the hydrocarbon production tubing 100, forming a substantially unrestricted flow path within the casing 140 wherein the tubing 100 and casing 140 form an annular space 120 therebetween and the surface 124 is comprised on the tubing 100, the casing 140, or a combination thereof in the area of treatment 180. The surface 124 can have a scale, which may be dissolved with an acid, such as a lactic acid, formed from the dissolution of the substantially cylindrical material 50 under suitable conditions in the unrestricted flow path to provide a treated surface 124.

In some embodiments, the wellbore 104 may further include an inflow device 160 within the tubing 100. The inflow device 160 can include a screen 162. Devices, such as the inflow device 160, may have the surface that scale may form thereon. The substantially cylindrical material 50 can include polylactic acid that is a precursor. After placement under the surface 130, the treatment composition under suitable conditions can degrade to an acid, such as a lactic acid, that may dissolve scale. Often, the treatment composition is placed directly under the surface without any solvent, such as water. Water present under the surface, particularly present in the wellbore, can dissolve the treatment composition under suitable conditions.

The suitable conditions may include a temperature of at least about 70° C., at least about 80° C., at least about 90° C., at least about 100° C., or at least about 110° C. in the area of treatment 180. The scale can hinder oil production and the dissolved substantially cylindrical material releases lactic acid to dissolve the scale to improve flowability, permeability, or both of the treated surface 124. The well 10 can further include a gas lift or a plunger lift. In some embodiments, the wellhead piping 20 may further include an access port 94 for inserting the substantially cylindrical material 50 into the annular space 120 for treating the surface 124 therein. The treated surface 124 has improved flowability, permeability, or both in comparison before treatment.

The scale can be removed in about 2 to about 100 hours upon exposure to lactic acid. Generally, the scale includes at least one of a carbonate, a sulfide, an oxide, or a combination thereof, and optionally, at least one metal. The carbonate may include a calcium carbonate or an iron carbonate, the sulfide may include an iron sulfide, and the oxide may include an iron oxide. Typically, the treatment can be used with low water production rates and moderate scale build-up. Usually, the well 10 is a hydrocarbon production well 10 that co-produces no more than about 32 meter-cubed per day ($m^3$/day) or no more than even about 48 $m^3$/day of water, or co-produces no more than about 16 to about 48 $m^3$/day of water. Often, the well 10 is an open-hole well.

In some embodiments, the acid that is generated and/or released in accordance with the methods and compositions may be used in any suitable acidizing treatment to acidize at least a portion of scale in a subterranean formation or one or more deposits contained therein, such as deposits that may reduce operability and/or permeability.

In some embodiments, the methods and compositions may also be less corrosive to tubing, casing, and other downhole equipment compared to conventional acidizing systems. Moreover, in some embodiments, the methods and compositions may permit corrosion considerations to not be a limiting factor in the design of the acidizing systems. Furthermore, the methods and compositions may reduce the hazards associated with acid handling for personnel and equipment. In some embodiments, the methods may include providing a treatment composition that includes an acid precursor and optionally a base fluid.

The treatment compositions of the methods and compositions may optionally be combined any suitable base fluid as will be appreciated on one of skill in the art upon viewing this disclosure. The term "base fluid" refers to the major component of the fluid (as opposed to components dissolved and/or suspended therein), and does not indicate any particular condition or property of that fluid such as its mass, amount, pH, etc. The base fluid may be added above or below the surface. In some embodiments, the base fluid is and/or includes an aqueous fluid or a non-aqueous fluid. Aqueous fluids that may be suitable for use in the methods may include water from any source. Such aqueous fluids may include fresh water, salt water (e.g., water containing one or more salts dissolved therein), brine (e.g., saturated salt water), seawater, or combinations thereof. In some embodiments, the aqueous fluids include one or more ionic species, such as those formed by salts dissolved in water. For example, seawater and/or produced water may include a variety of divalent cationic species dissolved therein. In some embodiments, the density of the aqueous fluid can be adjusted, among other purposes, to provide additional particulate transport and suspension in the methods. In some embodiments, the pH of the aqueous fluid may be adjusted (e.g., by a buffer or other pH adjusting agent) to a specific level, which may depend on, among other factors, the types of viscosifying agents, acids, and other additives included in the fluid. Examples of non-aqueous fluids that may be suitable for use in the methods include, but are not limited to oils, hydrocarbons, organic liquids, and the like. In some embodiments, the base fluid may include a mixture of one or more fluids and/or gases, including but not limited to emulsions, foams, and the like.

In some embodiments, the precursor may be present in the treatment fluids in an amount sufficient to generate and/or release the desired amount of acid. In some embodiments, the acid precursor may be present in the fluid in an amount from about 0.1% to about 50% by volume of the fluid present in the wellbore and/or subterranean formation. A person skilled in the art, with the benefit of this disclosure, will appreciate the amount of the acid precursor used in the treatment fluid may vary depending upon the application.

As described elsewhere herein, in one or more specific embodiments, the treatment compositions may be used in acidizing applications, for example, matrix acidizing, acid fracturing, scale dissolution and removal, polymer breaking, filter cake dissolution, and the like, but particularly scale dissolution. In some such embodiments, the precursor may be present in a fluid in an amount from about 1% to about 50% by volume of the fluid, additionally or alternatively, from about 2% to about 40%, additionally or alternatively, from about 3% to about 20% by volume of the fluid.

In some embodiments, the treatment composition may further include one or more one or more additional components or additives provide above or below the surface. For example, in some embodiments, the treatment composition may include one or more polar organic solvents. In such embodiments, the polar organic solvent may improve the solubility of the precursor in aqueous base fluids. Organic polar solvents that may be suitable for use in some embodiments include alcohols, glycols, glycol ethers, esters, amides, and their derivatives. Examples of organic polar solvents include, but are not limited to, methanol, ethanol, isopropanol, n-butanol, iso-butanol, tert-butanol, ethylene glycol, polyethylene glycol, propylene glycol, butanediol, pentanediol, glycerol, polyglycerol, 2-pyrrolidone, N-methyl-2-pyrrolidone, ethylene glycol monobutyl ether, polyglycol ethers, and combination thereof. In some embodiments, the polar organic solvent may be present in the fluid in an amount up to about 70% by volume of the fluid, additionally or alternatively, from about 1% to about 50%, additionally or alternatively, from about 2% to about 40%, additionally or alternatively, from about 5% to about 30% by volume of the fluid.

Additionally or alternatively, in some embodiments, the treatment composition may further include one or more surfactants. In such embodiments, surfactants that may be suitable for use in some embodiments may be independently selected from cationic surfactants, anionic surfactants, zwitterionic surfactants, nonionic surfactants and combinations thereof. Examples of cationic surfactants that may be suitable for use in some embodiments may be independently selected from alkyl amines, alkyl amine salts, quaternary ammonium salts such as trimethyltallowammonium halides (e.g., trimethyltallowarnmonium chloride, trimethyltallowammonium bromide), amine oxides, alkyltrimethyl amines, triethyl amines, alkyldimethylbenzylamines, cetyltrimethylammonium bromide, alkyl dimethyl benzylammonium chloride, trimethylcocoammonium chloride, derivatives thereof, and combinations thereof. Examples of anionic surfactants that may be suitable for use in some embodiments may be independently selected from alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, $C_8$ to $C_{22}$ alkylethoxylate sulfate, alkylphenol ethoxylate sulfate (or salts thereof). monoalkylphosphates, polyalkylphosphates, fatty acids, alkali salts of fatty acids, glyceride sulfates, sodium salts of fatty acids, soaps, derivatives thereof, and combinations thereof. Examples of amphoteric or zwitterionic surfactants that may be suitable for use in some embodiments may be independently selected from dihydroxyl alkyl glycinate, alkyl amphoacetate, or propionate, alkyl betaine, alkyl amidopropyl betaine and alkylimino mono- or di-propionates derived from certain waxes, fats and oils. Examples of nonionic surfactants that may be suitable for use in some embodiments may be independently selected from alcohol oxylalkylates, alkyl phenol oxylalkylates, nonionic esters such as sorbitan esters, alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylate, alkyl polyglucoside, derivatives thereof, and combinations thereof. In some embodiments, the surfactant may be present in the treatment fluid in an amount up to about 2.0% by volume of the fluid, additionally or alternatively, from about 0.01% to about 2.0%, additionally or alternatively, from about 0.2% to about 1.5%, additionally or alternatively, from about 0.5% to about 1.0% by volume of the fluid.

Additionally or alternatively, in some embodiments, the treatment composition may include one or more corrosion inhibitors. In such embodiments, corrosion inhibitors that may be suitable for use in some embodiments include any surfactant that is capable of inhibiting corrosion of metal surfaces (e.g., a film forming corrosion inhibitor). In some embodiments, the corrosion inhibitor may be independently selected from a hydrophilic moiety, and the hydrophilic moiety may include a quaternary amine, imine, amide, imidazoline, pyridine, carboxylic acid, phosphate ester, thiol group, a salt of any of the foregoing, and combinations thereof. In some embodiments, the hydrophilic moiety may be attached to or incorporated into one or more hydrocarbon chains having hydrophobic properties. In such embodiments, the hydrocarbon chains may independently include from about 8 to about 22 carbons and may be linear or branched, cyclic or acyclic, and/or saturated or unsaturated. Additionally or alternatively, in such embodiments, the hydrocarbon chains may be independently substituted with a functional group including one or more of: ether, ester, hydroxyl, alkane, alkene, alkyne and combinations thereof. In some embodiments, the corrosion inhibitor may be a film forming corrosion inhibitor. In some embodiments, the corrosion inhibitor may be present in the treatment fluid in an amount up to about 2.0% by volume of the fluid, additionally or alternatively, from about 0.01% to about 2.0%, additionally or alternatively, from about 0.2% to about 1.5%, additionally or alternatively, from about 0.5% to about 1.0% by volume of the fluid.

Additionally or alternatively, in some embodiments, the treatment composition optionally may include any number of additional additives, examples of which may be independently selected from buffering agents, salts, acids, diverting agents, fluid loss control additives, gas, nitrogen, carbon dioxide, surface modifying agents, tackifying agents, foamers, scale inhibitors, emulsifiers, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, viscosifying and/or gelling agents, breakers, weighting agents, relative permeability modifiers, resins, wetting agents, coating enhancement agents, filter cake removal agents, antifreeze agents (e.g., ethylene glycol), proppant particles, the like, and combinations thereof. The particular additive or combination of additives may be selected based upon factors including the intended use for the treatment composition, the relevant environmental conditions, and the intended characteristics of the treatment when so-used.

In some embodiments, one or more of the reactions by which the acid precursor generates and/or releases an acid may proceed in the presence of an aqueous fluid. In some embodiments, the fluid may include an aqueous base fluid and the acid precursor, and the acid precursor may generate and/or release an acid in the presence of the aqueous base fluid. In other embodiments, the fluid may include a non-aqueous base fluid and the acid precursor, for example, such that an aqueous fluid is absent from the treatment fluid in substantial amounts. In such embodiments, at least a portion of the fluid may contact an aqueous fluid located in the wellbore and/or subterranean formation (e.g., produced from the formation or provided to the wellbore and/or formation separately), and the acid precursor may generate and/or release an acid in the presence of that aqueous fluid.

In some embodiments, it may be desirable to speed up the generation and/or release of the acid. In such embodiments, the methods may include introducing a catalytic acid or a catalytic acid precursor into the wellbore. In some embodiments, the catalytic acid or the catalytic acid precursor may be introduced separately. In such embodiments, the catalytic acid or the catalytic acid precursor may contact the fluid, such as the fluid within the subterranean formation containing the acid precursor, and initiate and/or accelerate hydrolysis of the acid precursor, resulting in the generation and/or release of an acid. In other embodiments, the catalytic acid or the catalytic acid precursor may be included in a treatment fluid and introduced into the wellbore at the same time as the acid precursor. In such embodiments, the catalytic acid or the catalytic acid precursor may initiate and/or accelerate hydrolysis of the acid precursor, thereby resulting in the generation and/or release of an acid shortly after the introduction of the treatment fluid into the wellbore. Examples of catalytic acids suitable for some embodiments include, but are not limited to, inorganic acids, sulphuric acid, sulfamic acid, acidic anhydrides, boric acid, boron trihalides, organoboranes, aluminum trihalides, trimethylaluminum, zinc dichloride, titanium tetrachloride, tin dichloride, tin tetrachloride, ferric chloride, organic acids, formic acid, acetic acid, monochloroacetic acid, dichloroacetic acid, trichloroacetic acid, sulfonic acids, sulfonic acids, methanesulfonic acid, p-toluenesulfonic acid, lactic acid, glycolic acid, oxalic acid, propionic acid, butyric acid, and combinations thereof. Examples of catalytic acid precursors suitable for some embodiments include, but are not limited to, orthoesters, polyorthoesters, organic esters of carboxylic acids (e.g., formates, acetates, propanoates, lactates), sulfonates, sulfates, and combinations thereof.

In some embodiments, the catalytic acid or the catalytic acid precursor may be introduced in an amount from about 0.01% to about 5% by volume of the treatment fluid, additionally or alternatively, from about 0.1% to about 5%, additionally or alternatively, from about 0.5% to about 3% by volume of the treatment fluid. In some embodiments, the acid precursor may generate and/or release an acid when exposed to a certain temperature (e.g., in a subterranean formation). In some embodiments, the acid precursor may generate and/or release an acid in a subterranean formation having a temperature of from about 20° C. (68° F.) to about 204° C. (400° F.), additionally or alternatively, from about 20° C. (68° F.) to about 177° C. (350° F.), additionally or alternatively, a temperature of at least about 20° C. (68° F.), additionally or alternatively, a temperature as low as any of about 25, about 30, about 35, about 40, about 45, about 50, about 55, about 60, about 65, about 70, about 75, about 80, about 85, about 90, about 95, about 100, about 105, about 110, about 115, about 120, about 125, and about 130° C.

In some embodiments, it may be desirable to slow down the generation and/or release of the acid to, for example, provide a desired time delay and/or placement of the treatment fluid. In such embodiments, the methods may include introducing a base into the wellbore. In some embodiments, the base may be introduced separately from the treatment fluid. In such embodiments, the base may contact the treatment fluid (or other fluid within the subterranean formation containing the acid precursor) so as to increase the pH of the fluid, thereby slowing the generation and/or release of the acid. In other embodiments, the base may be included in the treatment fluid and introduced into the wellbore at the same time as the acid precursor. In such embodiments, the treatment fluid may have an initial pH of about 7.0 or greater, additionally or alternatively, an initial pH of from about 7.0 to about 14.0, additionally or alternatively, an initial pH of from about 8.0 to about 13.0, additionally or alternatively, initial pH of from about 9.0 to about 13.0.

Examples of bases suitable for some embodiments include, but are not limited to, inorganic bases, alkali metal or alkaline earth metal oxides, alkali metal or alkaline earth metal hydroxides, alkali metal or alkaline earth metal carbonates, alkali metal or alkaline earth metal bicarbonates, ammonia, organic bases, ammonium hydroxides, tetramethylammonium hydroxide, amines, pyridines, imidazoles, and combinations thereof. In some embodiments, the base may be introduced in an amount from about 0.01% to about 10% by volume of the fluid, additionally or alternatively, from about 0.1% to about 5%, additionally or alternatively, from about 1% to about 5% by volume of the fluid.

In some embodiments, the pH of the treatment fluid may decrease after being introduced into the wellbore, for example, as an acid is generated and/or released from the acid precursor. In some embodiments, the pH of the fluid may be about 3 or less after the fluid has been introduced into and/or present within the wellbore for a given duration, for example, within about 2 hours after the fluid has been introduced into and/or present within the wellbore, additionally or alternatively, within about 24 hours after the treatment fluid has been introduced into and/or present within the wellbore, additionally or alternatively, within about 72 hours after the fluid has been introduced into and/or present within the wellbore, additionally or alternatively, within about 5 days after the fluid has been introduced into and present within the wellbore.

In some embodiments, the treatment composition may be used during or in conjunction with various subterranean and/or wellbore-servicing operations. For example, in some embodiments, the fluid may be used in the course of and/or after drilling operations in which a wellbore has been drilled to penetrate a subterranean formation.

In some embodiments, the treatment composition may be introduced into and/or circulated in the wellbore after drilling so as to contact a biopolymer within the wellbore and/or subterranean formation, among other purposes, to at least partially degrade and/or remove one or more portions of the biopolymer. Examples of such biopolymers include, but are not limited to, xanthan gum, scleroglucan gum, diutan gum, guar gum, Whelan gum, and derivatives thereof, such as hydroxypropyl guar and carboxymethylhydroxypropyl guar, cellulose derivatives, such as hydroxyethylcellulose, carboxymethylcellulose, polyanionic cellulose, and starch and its derivatives, such as pregelatinized starch, carboxymethyl starch, chemically modified starch, and crosslinked starch, and combinations thereof. In some embodiments, circulation of the fluid in the wellbore and/or subterranean formation may be accomplished using various pumping and servicing equipment.

In some embodiments, the fluids may be introduced into and/or circulated in the wellbore after drilling to contact a filter cake deposited on the walls of the wellbore and/or in the subterranean formation, among other purposes, to at least partially degrade and/or remove one or more portions of the filter cake. Additionally or alternatively, in some embodiments, the fluids may be used prior to placement of cement and/or casing within a wellbore, among other reasons, in order to remove a filter cake from the wellbore. In some such embodiments, the fluids may be continuously pumped down the casing or pipe and upwardly through an annulus in the wellbore in contact with the filter cake as a pre-flush just prior to introducing a spacer fluid and a cement slurry into the annulus. In some embodiments, the quantity of the treatment fluids pumped through the annulus prior to introduction of the cementitious slurry (as well as other compositions used to dissolve components of the filter cake) may be a predetermined quantity calculated to remove substantially all of the filter cake, which may provide for a more successful and efficient cementing job.

Additionally or alternatively, in some embodiments, the treatment composition may be used in the course of a stimulation treatment. In such embodiments, the treatment composition may be introduced into a portion of a subterranean formation where it may be allowed to contact at least a portion of the subterranean formation and at least partially dissolve carbonate minerals therein so as to create one or more voids in the subterranean formation. In some embodiments, a treatment fluid may be introduced into the subterranean formation at or above a pressure sufficient to create or enhance one or more fractures within the subterranean formation, for example, at or above fracture-initiation pressure. In other embodiments, introduction of the treatment fluid may be carried out at a pressure below that which would create or enhance one or more fractures within the subterranean formation.

Additionally or alternatively, in some embodiments, the treatment composition may be used in the course of a fracturing treatment. In some embodiments, the treatment composition may be introduced into a portion of a subterranean formation (e.g., one or more fractures) containing a viscosified fracturing fluid. In such embodiments, at least a portion of the treatment composition may contact the viscosified fracturing fluid to at least partially reduce the viscosity of the fracturing fluid. In some embodiments, the viscosified fracturing fluid may include proppants, and the proppants may be deposited within the subterranean formation, for example, within one or more fracture, as the viscosity of the fracturing fluid is at least partially reduced via the activity of the fluid.

Additional or alternative subterranean operations in which the treatment composition may be used include, but are not limited to, pre-flush treatments, afterflush treatments, hydraulic fracturing treatments, sand control treatments (e.g., gravel packing), "frac-pack" treatments, wellbore clean-out treatments, stuck pipe treatments, filter cake removal treatments, skin remediation treatments, and other operations where a fluid having the treatment composition as disclosed herein may be useful. In some embodiments, the treatment composition may also be used in cleaning operations or treatments conducted at the surface that are used to clean or prepare equipment or other components that are subsequently used in subterranean operations.

The treatment composition may be prepared using any suitable method and/or equipment (e.g., blenders, mixers, stirrers, etc.) known in the art at any time prior to their use. The treatment composition may be prepared at least in part at a well site or at an offsite location. In some embodiments, no preparation of the treatment composition is required. In some embodiments, the treatment composition and base fluid may be mixed and/or other components at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. Additionally or alternatively, in some embodiments, the treatment fluids may be prepared, either in whole or in part, at an offsite location and transported to the site where the treatment or operation is conducted. Two or more components of the treatment compositions may be mixed together at the surface and introduced into the formation together, or one or more components may be introduced into the formation at the surface separately from other components such that the components mix or intermingle in a portion of the formation to form a treatment. In either such case, the treatment composition is deemed to be introduced into at least a portion of the subterranean formation.

In some embodiments, various wellbore conditions can be measured by sensors, which can be located in the wellbore. For purposes of this disclosure, the term "sensors" is understood to include sources (to emit and/or transmit energy and/or signals), receivers (to receive and/or detect energy and/or signals), and transducers (to operate as a source and/or receiver). In some embodiments, information from the sensors may be fed into a system or tool that can determine an injection rate or rate profile.

It is also to be recognized that the disclosed treatment composition may directly or indirectly affect the various downhole equipment and tools that may come into contact with the treatment during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Various of these components may be included in the systems generally described above in FIG. 3.

The method also includes introducing the treatment composition in a wellbore penetrating a subterranean formation. In some embodiments, the method also includes allowing the acid to acidize the portion of the subterranean formation. In some embodiments, the method includes contacting at least a portion of a biopolymer or a filter cake located in the subterranean formation with the acid to at least partially degrade at least a portion of the biopolymer or the filter cake. In some embodiments, the method also includes introducing a catalytic acid or a catalytic acid precursor into the wellbore and contacting at least a portion of the treatment fluid with the catalytic acid or the catalytic acid precursor.

In one or more embodiments described in the preceding paragraph, the acid precursor is present in the fluid in a concentration of from about 1% to about 20% by volume of the composition. In some embodiments, the treatment composition includes an additive independently selected from, for example, surfactants, corrosion inhibitors, buffering agents, salts, acids, diverting agents, fluid loss control additives, gas, nitrogen, carbon dioxide, surface modifying agents, tackifying agents, foamers, scale inhibitors, emulsifiers, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, gelling agents, breakers, weighting agents, relative permeability modifiers, resins, wetting agents, coating enhancement agents, filter cake removal agents, antifreeze agents, proppant particles, and combinations thereof. In some embodiments, the treatment composition includes a catalytic acid or a catalytic acid precursor. In some embodiments, the catalytic acid or the catalytic acid precursor is present in the composition in a concentration of from about 0.01% to about 5% by volume of the fluid.

EXAMPLES

The aspects having been generally described, the following examples are given as particular aspects of the disclosure and to demonstrate the practice and advantages thereof. It is understood that the examples are given by way of illustration and are not intended to limit the specification or the claims in any manner.

Example 1

PLA Thermal Hydrolysis

This experiment demonstrates that PLA releases acid under the simulated downhole conditions. PLA beads are placed at two percent, by weight, in municipal water. At 110° C., the PLA beads appear not to begin decomposition until 2 hours of incubation. The treated water remains a neutral pH of about six then drops to about one after overnight incubation. This decomposition is confirmed by sampling a limestone reaction with 1:1 weight ratio of PLA to limestone. The treated water accordingly showed negligible change for the first 2 hours then has a strong reaction, creating large number of bubbles, after overnight incubation. When heated for four days at 110° C. all PLA decomposes within the bottle. This complete decomposition demonstrates additional features for "residue-free" and no need for an extra "salting matrix" in the treatment composition.

Example 2

Limestone Dissolution for PLA in Simulated Downhole Condition

This experiment demonstrates the process that the PLA thermally hydrolyzes acids and has an instant in situ reaction with simulated scale deposition. An amount of PLA is placed in an amount of two percent by weight in municipal water at 110° C. The result show that, after a two-hour activation, the acid produced through PLA thermal hydrolysis gently reacts (involving continuous smooth generation of bubbles within bottles) and the treated water maintains a moderate neutral pH. This process can mitigate many common health, safety, environment, and corrosion concerns for acid treatment. The PLA to limestone ratio is 1:3 by weight. The scale dissolution capacity is measured as about 0.20 kilogram of limestone per kilogram of PLA beads, after 18-hours incubation.

Additional Disclosure

The following are non-limiting, specific embodiments in accordance with the present disclosure.

A first embodiment, which is a method for treating a well penetrating a subterranean formation, comprises placing a treatment composition comprising a polylactic acid into the well, wherein the treatment composition is in the form of pellets, a cylindrical rod, or both.

A second embodiment, which is the method of the first embodiment, further comprises positioning the treatment composition adjacent a treatable surface in the well and allowing the treatment composition to form lactic acid that contacts the treatable surface.

A third embodiment, which is the method of any one of the first through second embodiments, wherein the treatable surface comprises scale and the lactic acid contacts the scale and removes at least a portion of the scale from the surface to provide a treated surface.

A fourth embodiment, which is the method of any one of the first through third embodiments, wherein the treatable surface is provided by a tubular positioned in the well.

A fifth embodiment, which is the method of any one of the first through fourth embodiments, wherein the tubular is a casing, a hydrocarbon production tubing, or both.

A sixth embodiment, which is the method of any one of the first through fifth embodiments, wherein the treatable surface is disposed within an annular space formed between the hydrocarbon production tubular disposed within the casing.

A seventh embodiment, which is the method of any one of the first through sixth embodiments, wherein the treatable surface is provided by and disposed within the subterranean formation.

An eighth embodiment, which is the method of any one of the first through seventh embodiments, wherein the treatable surface is provided by hydrocarbon production equipment located in the well or the subterranean formation.

A ninth embodiment, which is the method of any one of the first through eighth embodiments, wherein the treatment composition is a cylindrical rod and the cylindrical rod is placed into the well via a surface well head.

A tenth embodiment, which is the method of any one of the first through ninth embodiments, wherein the cylindrical rod is positioned adjacent a treatable surface by allowing the cylindrical rod to travel down the well via gravity, via pumping fluid into the well head and down the well, or both.

An eleventh embodiment, which is the method of any one of the first through tenth embodiments, wherein the well comprises a tubular positioned in the well and coupled to the surface well head, wherein the cylindrical rod travels from the well head a distance down the well though an inner bore of the tubular to adjacent the treatable surface, and wherein the inner bore is unobstructed along the distance traveled by the cylindrical rod.

A twelfth embodiment, which is the method of any one of the first through eleventh embodiments, wherein the treatment composition is a plurality pellets and the plurality of pellets are placed into the well via a surface well head.

A thirteenth embodiment, which is the method of any one of the first through twelfth embodiments, wherein the plurality of pellets are positioned adjacent a treatable surface by allowing the cylindrical rod to travel down the well via gravity, via pumping fluid into the well head and down the well, or both.

A fourteenth embodiment, which is the method of any one of the first through thirteenth embodiments, wherein the well comprises a tubular positioned in the well and coupled to the surface well head, wherein the tubular forms an annular space between an outer surface of the tubular and an inner surface of the well, wherein the plurality of pellets travels from the well head a distance down the well though the annular space to adjacent the treatable surface, and wherein the annular space is unobstructed along the distance traveled by the plurality of pellets.

A fifteenth embodiment, which is the method of any one of the first through fourteenth embodiments, wherein the pellets, the cylindrical rod, or both are solid.

A sixteenth embodiment, which is the method of anyone of the first through fifteenth embodiments, wherein the pellets, the cylindrical rod, or both do not contact water prior to being placed into the well.

A seventeenth embodiment, which is the method of any one of the first through sixteenth embodiments, wherein the solid cylindrical rod has a dimension comprising a diameter and a length.

An eighteenth embodiment, which is the method of any one of the first through seventeenth embodiments, wherein the solid cylindrical rod has a diameter of about 0.013 m to about 0.051 m and a length of about 0.15 m to about 0.61 m.

A nineteenth embodiment, which is the method of any one of the first through eighteenth embodiments, wherein each of the one or more pellets has a width of about 0.0064 m to about 0.019 m, a thickness of about 0.0064 m to about 0.019 m, and a length of about 0.0064 m to about 0.051 m.

A twentieth embodiment, which is the method of any one of the first through nineteenth embodiments, wherein the solid cylindrical rod is water soluble and decomposes in situ under ambient conditions present adjacent the treatable surface.

A twenty-first embodiment, which is the method of any one of the first through twentieth embodiments, wherein the treated surface has improved flowability, permeability, or both in comparison before treatment.

A twenty-second embodiment, which is the method of any one of the first through twenty-first embodiments, wherein the scale is removed in about 2 to about 100 hours.

A twenty-third embodiment, which is the method of any one of the first through twenty-second embodiments, wherein the scale comprises at least one of a carbonate, a sulfide, an oxide, or a combination thereof.

A twenty-fourth embodiment, which is the method of any one of the first through twenty-third embodiments, wherein the scale comprises at least one metal.

A twenty-fifth embodiment, which is the method of any one of the first through twenty-fourth embodiments, wherein the carbonate comprises a calcium carbonate or an iron carbonate, the sulfide comprises an iron sulfide, and the oxide comprises an iron oxide.

A twenty-sixth embodiment, which is the method of any one of the first through twenty-fifth embodiments, wherein the well is a hydrocarbon production well that co-produces no more than about 32 meter-cubed per day (m3/day) of water.

A twenty-seventh embodiment, which is the method of any one of the first through twenty-sixth embodiments, wherein the well is a hydrocarbon production well that co-produces no more than about 16 to about 48 m3/day of water.

A twenty-eighth embodiment, which is the method of any one of the first through twenty-seventh embodiments, wherein the polylactic acid comprises a specific gravity of about 0.9 to about 1.5.

A twenty-ninth embodiment, which is the method of any one of the first through twenty-eighth embodiments, wherein the polylactic acid comprises a specific gravity of about 1.1 to about 1.3.

A thirtieth embodiment, which is the method of any one of the first through twenty-ninth embodiments, wherein the polylactic acid has a melt temperature of about 60° C. to about 200° C.

A thirty-first embodiment, which is the method of any one of the first through thirtieth embodiments, wherein the polylactic acid has a melt temperature of about 70° C. to about 160° C.

A thirty-second embodiment, which is the method of any one of the first through thirty-first embodiments, wherein the substantially cylindrical material is substantially water soluble.

A thirty-third embodiment, which is the method of any one of the first through thirty-second embodiments, wherein the polylactic acid has a molecular weight up to about 1,500,000 g/mol.

A thirty-fourth embodiment, which is the method of any one of the first through thirty-third embodiments, wherein the polylactic acid is an aliphatic polyester.

A thirty-fifth embodiment, which is the method of any one of the first through thirty-fourth embodiments, wherein the molecular weight of the polylactic acid is no more than about 5,400 g/mol.

A thirty-sixth embodiment, which is the method of any one of the first through thirty-fifth embodiments, wherein the molecular weight of the polylactic acid is no more than about 720 g/mol.

A thirty-seventh embodiment, which is a method for an oil producing well comprising a wellhead piping communicating with a wellbore, comprises: introducing a substantially cylindrical material comprising a polylactic acid into the wellhead piping; providing first and second valves and coupled to the wellhead piping forming an isolation chamber; opening the first valve and transporting the substantially cylindrical material into the isolation chamber; closing the first valve isolating the substantially cylindrical material; and opening the second valve and transporting the substantially cylindrical material into the wellbore a distance to a location at least partially adjacent to an area of treatment.

A thirty-eighth embodiment, which is the method of the thirty-seventh, wherein the wellbore comprises a tubing forming a substantially unrestricted flow path within a casing wherein the tubing and casing form an annular space therebetween and a surface is comprised on the tubing, the casing, or a combination thereof in the area of treatment, and the surface has a scale dissolved with an acid formed from the dissolution of the substantially cylindrical material under suitable conditions in the unrestricted flow path to provide a treated surface.

A thirty-ninth embodiment, which is the method of any one of the thirty-seventh through thirty-eighth embodiments, wherein the wellbore further comprises an inflow device within the tubing.

A fortieth embodiment, which is the method of any one of the thirty-seventh through thirty-ninth embodiments, wherein the inflow device comprises a screen having the surface with the scale.

A forty-first embodiment, which is the method of any one of the thirty-seventh through fortieth embodiments, wherein the suitable conditions comprise a temperature of at least about 110° C. in the area of treatment.

A forty-second embodiment, which is the method of any one of the thirty-seventh through forty-first embodiments, wherein the scale hinders oil production and the dissolved substantially cylindrical material releases lactic acid to dissolve the scale to improve flowability, permeability, or both of the treated surface.

A forty-third embodiment, which is the method of any one of the thirty-seventh through forty-second embodiments, wherein the well further comprises a gas lift.

A forty-fourth embodiment, which is the method of any one of the thirty-seventh through forty-third embodiments, wherein the well further comprises a plunger lift.

A forty-fifth embodiment, which is the method of anyone of the thirty-seventh through forty-fourth embodiments, wherein the wellhead piping further comprises an access port for inserting the substantially cylindrical material into the annular space for treating the surface therein.

A forty-sixth embodiment, which is a method for treating a well penetrating a subterranean formation or is the method of any one of the second through forty-fifth embodiments, comprises placing a treatment composition comprising a polylactic acid into the well,
wherein the treatment composition is in the form of pellets, a cylindrical rod, or both, and
wherein the polylactic acid comprises a group of the formula:

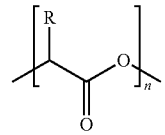

wherein:
n is an integer of 77 to 10,000; and
R is hydrogen, an alkyl, an aryl, an alkylaryl, an acetyl, or a heteroatom optionally substituted with an alkyl, an aryl, an alkylaryl, or an acetyl.

A forty-seventh embodiment, which is a method for treating a well penetrating a subterranean formation or is the method of any one of the second through forty-sixth embodiments, comprises placing a treatment composition comprising a polylactic acid into the well,
wherein the treatment composition is in the form of pellets, a cylindrical rod, or both, and
wherein the polylactic acid comprises a compound of the formula:

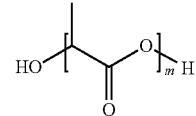

wherein:
m is an integer of 2 to 75.

A forty-eighth embodiment, which is the method of the forty-seventh embodiment, wherein m is an integer of 2 to 10.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method for treating a well penetrating a subterranean formation, comprising:
placing a treatment composition comprising a polylactic acid into the well, wherein the treatment composition is in a form of a substantially cylindrical rod having a diameter of about 0.013 m to about 0.051 m and a length of about 0.15 m to about 0.61 m.

2. The method of claim 1, wherein the substantially cylindrical rod travels down the well via gravity, via pumping fluid into a wellhead and down the well, or both.

3. The method of claim 1, wherein the polylactic acid comprises a specific gravity of about 0.9 to about 1.5.

4. The method of claim 1, wherein the polylactic acid comprises a specific gravity of about 1.1 to about 1.3.

5. The method of claim 1, wherein the substantially cylindrical rod is substantially water soluble.

6. The method of claim 1, wherein the polylactic acid has a molecular weight up to about 1,500,000 g/mol.

7. The method of claim 1, wherein the polylactic acid is an aliphatic polyester.

8. The method of claim 1, wherein the well is a hydrocarbon production well that co-produces no more than about 32 meter-cubed per day of water.

9. The method of claim 1, wherein the solid substantially cylindrical rod does not contact water prior to being placed into the well.

10. The method of claim 1, wherein the well is a hydrocarbon production well that co-produces no more than about 16 to about 48 m$^3$/day of water.

11. The method of claim 1, wherein the solid substantially cylindrical rod is placed into the well via a surface well head.

12. The method of claim 1, further comprising positioning the treatment composition in the well and forming lactic acid that contacts a treatable surface.

13. The method of claim 12, wherein the treatable surface comprises scale and the lactic acid contacts the scale on the treatable surface and removes at least a portion of the scale from the treatable surface to provide a treated surface.

14. The method of claim 13, wherein the treatable surface is provided by a tubular positioned in the well.

15. The method of claim 14, wherein the tubular is a casing, a hydrocarbon production tubing, or both.

16. The method of claim 15, wherein the treatable surface is disposed within an annular space formed between the tubular disposed within the casing.

17. The method of claim 13, wherein the treatable surface is provided by and disposed within the subterranean formation.

18. The method of claim 13, wherein the treatable surface is provided by hydrocarbon production equipment located in the well or the subterranean formation.

19. The method of claim 13, wherein the scale comprises at least one of a carbonate, a sulfide, an oxide, or a combination thereof.

20. A method for treating a well penetrating a subterranean formation, comprising:
placing a treatment composition in a form of a cylindrical rod having a diameter of about 0.013 m to about 0.051 m and a length of about 0.15 m to about 0.61 m comprising a polylactic acid into a wellhead of the well;
dropping the cylindrical rod into a wellbore via gravity;
reacting the cylindrical rod in situ releasing lactic acid; and
cleaning solid scale to mitigate scale build-up.

* * * * *